United States Patent
Zhang et al.

(10) Patent No.: US 9,298,582 B1
(45) Date of Patent: Mar. 29, 2016

(54) METHOD AND APPARATUS FOR PERFORMANCE DATA TRANSFORMATION IN A CLOUD COMPUTING SYSTEM

(75) Inventors: Lianlai Zhang, Vienna, VA (US); Lida He, Sleepy Hollow, NY (US); Jamel Hammouda, Springfield, VA (US); Tong Yu, Great Falls, VA (US); Cheuk Lam, Yorktown Heights, NY (US)

(73) Assignee: EMC Corporation, Hopkinton, MA (US)

(*) Notice: Subject to any disclaimer, the term of this patent is extended or adjusted under 35 U.S.C. 154(b) by 157 days.

(21) Appl. No.: 13/536,512

(22) Filed: Jun. 28, 2012

(51) Int. Cl.
G06F 15/173 (2006.01)
G06F 11/34 (2006.01)

(52) U.S. Cl.
CPC ................... *G06F 11/3409* (2013.01)

(58) Field of Classification Search
CPC .. H04L 12/2417; H04L 41/5009; H04L 43/08; H04L 12/2467; H04L 12/2634; H04L 12/2471; H04L 69/02; H04L 29/06612; H04L 45/586; H04L 49/70; H04L 12/4641; H04L 12/2673; H04L 25/03974; H04L 43/0888; H04L 43/0894; H04L 43/0876; H04L 43/0882; H04L 45/125; H04L 69/00; H04L 69/32; H04L 2012/00; H04L 2012/46; H04L 2012/4629; H04L 2029/00; G06F 13/00; G06F 17/30286; G06F 11/3433
USPC .......................................................... 709/224
See application file for complete search history.

(56) References Cited

U.S. PATENT DOCUMENTS

| | | | |
|---|---|---|---|
| 6,006,016 A | 12/1999 | Falgon et al. | |
| 6,249,755 B1 | 6/2001 | Yemini et al. | |
| 6,347,374 B1 | 2/2002 | Drake et al. | |
| 7,016,954 B2 | 3/2006 | McKenzie et al. | |
| 7,349,826 B2 | 3/2008 | Subramanian et al. | |
| 7,401,338 B1* | 7/2008 | Bowen et al. | 719/328 |
| 7,500,142 B1 | 3/2009 | Cowart et al. | |
| 7,529,181 B2 | 5/2009 | Yardeni et al. | |
| 7,552,443 B2 | 6/2009 | Upton | |
| 7,574,413 B2 | 8/2009 | Larson et al. | |
| 7,979,245 B1* | 7/2011 | Bourlatchkov | G06F 11/3409 703/2 |
| 8,031,634 B1 | 10/2011 | Artzi et al. | |
| 8,117,306 B1 | 2/2012 | Baumback et al. | |
| 8,301,755 B2 | 10/2012 | DePeuter et al. | |
| 8,479,048 B2 | 7/2013 | Morimura et al. | |
| 8,886,705 B1* | 11/2014 | Tewari | G06F 17/30209 709/203 |
| 9,053,000 B1 | 6/2015 | Lam | |
| 2002/0174267 A1* | 11/2002 | Erdmenger | H04L 67/06 719/330 |
| 2003/0204759 A1* | 10/2003 | Singh | G06F 1/3203 713/320 |
| 2004/0049572 A1 | 3/2004 | Yamamoto et al. | |
| 2004/0083284 A1 | 4/2004 | Ofek et al. | |
| 2005/0086331 A1* | 4/2005 | Wadia et al. | 709/221 |

(Continued)

OTHER PUBLICATIONS

U.S. Appl. No. 13/435,017, filed Mar. 30, 2012, He, et al.

(Continued)

*Primary Examiner* — Mohamed Wasel
*Assistant Examiner* — Tsung Wu
(74) *Attorney, Agent, or Firm* — Daly, Crowley, Mofford & Durkee, LLP

(57) ABSTRACT

Methods and apparatus to provide performance data transformation in a cloud computing system. In one embodiment, the system performs data transformation with information from a configuration subsystem, to generate metrics for network layer, storage layer, compute layer, and logical components.

18 Claims, 14 Drawing Sheets

(56) References Cited

U.S. PATENT DOCUMENTS

| | | | |
|---|---|---|---|
| 2005/0114487 A1 | | 5/2005 | Peng et al. |
| 2005/0251567 A1* | | 11/2005 | Ballew .................. G06F 9/5077 709/223 |
| 2006/0224725 A1* | | 10/2006 | Bali et al. ...................... 709/224 |
| 2007/0192859 A1 | | 8/2007 | Shahar et al. |
| 2009/0070463 A1 | | 3/2009 | Cowart et al. |
| 2009/0182698 A1 | | 7/2009 | Bethke et al. |
| 2011/0029960 A1 | | 2/2011 | Cimadamore et al. |
| 2011/0055138 A1 | | 3/2011 | Khanduja et al. |
| 2011/0154367 A1 | | 6/2011 | Gutjahr et al. |
| 2011/0314330 A1 | | 12/2011 | Morimura et al. |
| 2011/0320874 A1 | | 12/2011 | Shimada et al. |
| 2012/0151025 A1 | | 6/2012 | Bailey et al. |
| 2012/0221314 A1* | | 8/2012 | Bourlatchkov et al. ......... 703/21 |
| 2012/0221589 A1 | | 8/2012 | Shahar et al. |
| 2012/0253773 A1 | | 10/2012 | Cheon et al. |
| 2012/0284713 A1* | | 11/2012 | Ostermeyer et al. .............. 718/1 |
| 2012/0297061 A1* | | 11/2012 | Pedigo et al. ................. 709/224 |
| 2013/0035976 A1 | | 2/2013 | Buflett |
| 2013/0054779 A1* | | 2/2013 | Cradick et al. ................ 709/224 |
| 2013/0166724 A1* | | 6/2013 | Bairavasundaram et al. 709/224 |
| 2014/0237297 A1 | | 8/2014 | Nagura et al. |

OTHER PUBLICATIONS

U.S. Appl. No. 13/536,726, filed Jun. 28, 2012, Lam, et al.

U.S. Appl. No. 13/628,706, Sep. 27, 2012, Lam, et al.

Vblock Infrastructure Platforms Series 300 Architecture Overview, Version 2.4, Aug. 2011, The Virtual Computing Environment Company, www.vce.com, 74 pages.

Cisco Unified Computing System and EMC VNXe3300 Unified Storage System, White Paper, Jan. 2011, Revision 1.0, EMC², Cisco Systems, Inc., 170 West Tasman Drive, San Jose, CA 95134-1706, www.cisco.com, 9 pages.

EMC Integrated Infrastructure for VMware Enabled by EMC VNXe3100 and VMware vSphere 4.1, An Architectural Overview, White Paper, EMC Global Solutions, EMC², Feb. 2011, 24 pages.

VMware vStorage APIs for Array Integration with EMC VNX Series for NAS, Benefits of EMC VNX fo File Inegration with VMware VAAI, White Paper, EMC Solutions Group, Jan. 2012, EMC², 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 75 pages.

U.S. Appl. No. 13/435,017, filed Mar. 30, 2012, 93 pages.

U.S. Appl. No. 13/536,726, filed Jun. 28, 2012, 73 pages.

U.S. Appl. No. 13/628,706, filed Sep. 27, 2012, 120 pages.

U.S. Appl. No. 13/435,017 Office Action dated Mar. 7, 2014, 19 pages.

U.S. Appl. No. 13/628,706 Notice of Allowance dated Sep. 29, 2014, 15 pages.

U.S. Appl. No. 13/435,017 Notice of Allowance dated Oct. 16, 2014, 17 pages.

U.S. Appl. No. 13/536,726 Final Office Action dated on Nov. 10, 2015, 15 pages.

Response Filed Aug. 6, 2015; To Office Action Dated Apr. 8, 2015; For U.S. Appl. No. 13/536,726; 10 Pages.

Office Action dated Apr. 8, 2015 for U.S. Appl. No. 13/536,726; 19 pages.

Office Action dated Apr. 8, 2015; for U.S. Appl. No. 13/536,726; 35 pages.

* cited by examiner

Data Model for Transforming Counter to Rate

```
<datamodel>
    <objects>
        object name="StorageProcessor">
            <metrics>
                <metric name="ReadThroughput"
                    transform="rate (ReadIOs)"
                </metric>
            </metrics>
            <relationships>
                <relationship/>
            </relationships>
        </object>
    </objects>
</datamodel>
```

Data Model for Transforming Two Metrics to One

```
<datamodel>
    <objects>
        <object name="StorageVolume">
            <metrics>
                <metric name="Utilization"
                    transform="100 * IOTimeCounter/
                    (IOTimeCounter + IdleTimeCounter)"
                </metric>
            </metrics>
            <relationships>
                <relationship/>
            </relationships>
        </object>
    </objects>
</datamodel>
```

Data Model for Transforming Metrics via Relationship

```
<datamodel>
    <objects>
        <object name="Service">
            <metrics>
                <metric name="StorageTotalThroughput"
                    transform="sum (StorageVolume.
                    TotalThroughput)"
                </metric>
            </metrics>
            <relationships>
                <relationship/>
            </relationships>
        </object>
    </objects>
</datamodel>
```

Data Model for Transforming Metrics via Relationship

```
<datamodel>
    <objects>
        <object name="Service">
            <metrics>
                <metric name="StorageUtilization"
                    transform="average(StorageVolume.
                    Utilization)"
                </metric>
            </metrics>
            <relationships>
                <relationship/>
            </relationships>
        </object>
    </objects>
</datamodel>
```

Data Model for Defining Object Relationships

```
<datamodel>
    <objects>
        <object name="StorageSystem">
            <metrics>
                <metric/>
            </metrics>
            <relationships>
                <relationship name="consistof"
                   target="StorageProcessor"/>
                <relationship name="consistof"
                   target="StorageVolume"/>
            </relationships>
        </object>
    </objects>
</datamodel>
```

*FIG. 13*

Data Model for Defining Object Relationships

```
<datamodel>
    <objects>
        <object name="Service">
            <metrics>
                <metric/>
            </metrics>
            <relationships>
                <relationship name="consistof"
                   target="Blade"/>
                <relationship name="consistof"
                   target="StorageVolume"/>
            </relationships>
        </object>
    </objects>
</datamodel>
```

*FIG. 14*

METHOD AND APPARATUS FOR PERFORMANCE DATA TRANSFORMATION IN A CLOUD COMPUTING SYSTEM

BACKGROUND

As is known in the art, cloud computing systems contain large numbers of servers, storage systems, networking devices, software modules and components. Various performance metrics are provided by these components for monitoring, metering, or capacity planning purpose. These performance metrics usually contain raw data, e.g., the cumulative count of IOs (input/outputs) or TotalIOs, of a front end adapter in a storage system, which are not always desirable for the above mentioned purpose.

Derived metrics based on the current or historical values of one or more metrics often provide additional insight over the original raw metrics. Also, performance metrics from each individual component are disjointed since they do not reflect the performance of logical components across multiple physical components. For example, a service created in a cloud computing system composes compute, storage and network resources from physical components. The service does not have performance data on itself. In order to measure performance, metrics need to be defined based on the hardware components it uses. Furthermore, aggregation of performance metrics based on physical or logical relationships among the components can provide high level performance data, while reduce the amount of data need to be stored.

With huge amounts of performance data on a wide range of metrics periodically sampled from various hardware components in a cloud computing environment, it is desirable to associate the performance metrics with other related physical resources, and map them to relevant logical components to provide insight of resource usage, e.g., how many hardware resources are utilized by a service, rather than how many hardware resources are allocated to it.

SUMMARY

In one aspect of the invention, a method comprises collecting performance data from components of a cloud computing system, wherein the cloud components include at least one of a fabric interconnect in a compute layer, a switch in a network layer, and a storage array in a storage layer, the cloud computing system having a management layer, processing, using a computer processor, raw data from objects including at least one fabric interconnect, switch and storage array, obtaining topology information for the at least one fabric interconnect, switch, and storage array using model service adapters, and transforming, using the topology information, the raw data into performance metrics.

The method can further include one or more of the following features: a configuration contains types of the objects for which raw performance metrics can be collected, the objects can be related and defined in the configuration, transforming performance data from network the layer, transforming performance data from the storage layer, transforming performance data from the compute layer, transforming performance data from the management layer, creating performance metrics for logical layers based on relationships to physical layers, the performance metric includes a storage total throughput metric for a service defined as a sum of total throughput of individual storage volumes allocated to the service, the performance metric includes a storage utilization metric for a service, wherein the storage utilization metric comprises an arithmetic average of utilization of storage volumes, using a data model for defining relationships between resources of the storage system and a storage processor, and between the storage system and a storage volume, using a data model for defining relationships of a service comprising blades in the computer layer and storage volumes in the storage layer, and/or querying the relationships using a topology service containing the topology information, wherein the topology service uses definitions from a model supplier adapter (MSA).

In another aspect of the invention, an article comprises: a computer readable medium containing non-transitory stored instructions that enable a machine to perform: collecting performance data from components of a cloud computing system, wherein the cloud components include at least one of a fabric interconnect in a compute layer, a switch in a network layer, and a storage array in a storage layer, the cloud computing system having a management layer, processing, using a computer processor, raw data from objects including at least one fabric interconnect, switch and storage array, obtaining topology information for the at least one fabric interconnect, switch, and storage array using model service adapters, and transforming, using the topology information, the raw data into performance metrics.

The article can further include one or more of the following features: instructions for transforming performance data from network the layer, the storage layer, and the compute layer, the performance metric includes a storage total throughput metric for a service defined as a sum of total throughput of individual storage volumes allocated to the service, and/or the performance metric includes a storage utilization metric for a service, wherein the storage utilization metric comprises an arithmetic average of utilization of storage volumes.

In another aspect of the invention, a system comprises: a cloud computing system comprising a computer layer, a storage layer, a network layer coupled between the compute and storage layer, and a management layer to control the system, the management layer comprising stored instructions to enable the management layer to: collect performance data from components of the cloud computing system, process raw data, perform transformation of the processed raw data, and use configuration to adjust the raw data transformation.

BRIEF DESCRIPTION OF THE DRAWINGS

The foregoing features of this invention, as well as the invention itself, may be more fully understood from the following description of the drawings in which:

FIG. 13 is schematic representation of data model for defining object relationships containing storage system;

FIG. 14 is schematic representation of data model for defining object relationships containing service;

DETAILED DESCRIPTION

Figure 1:
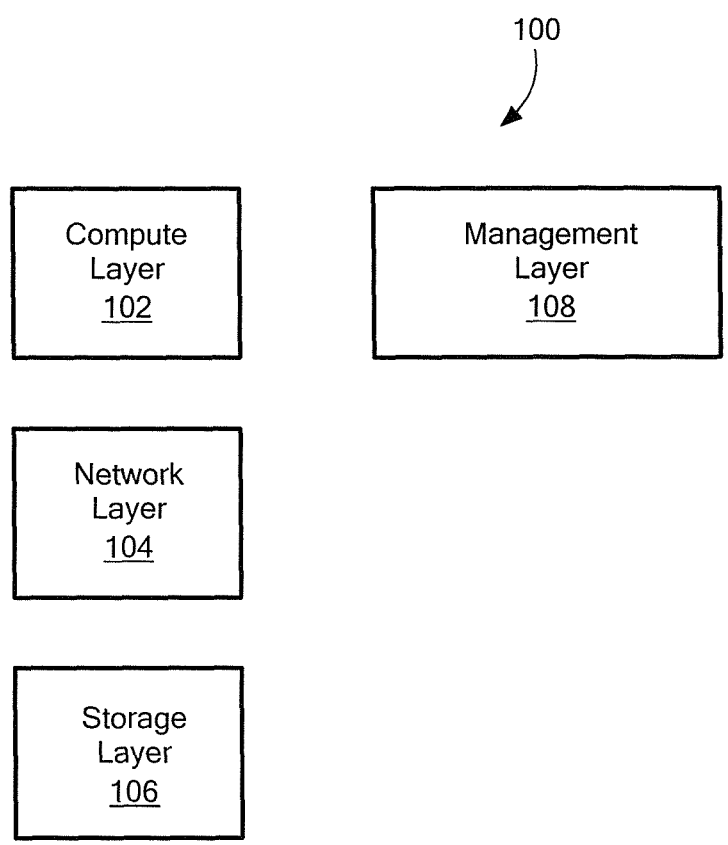
FIG. 1 is a high level schematic representation of a cloud computing system having performance data collection and transformation in accordance with exemplary embodiments of the invention.

FIG. 1 shows an exemplary cloud computing environment 100 having performance data collection and transformation in accordance with exemplary embodiments of the invention. The environment includes a compute layer 102, a network layer 104, a storage layer 106, and a management layer 108. The environment may be referred to as a platform. It is understood that any practical number of platforms can be combined into a cloud computing environment.

The compute layer 102 comprises components, such as blade servers, chassis and fabric interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
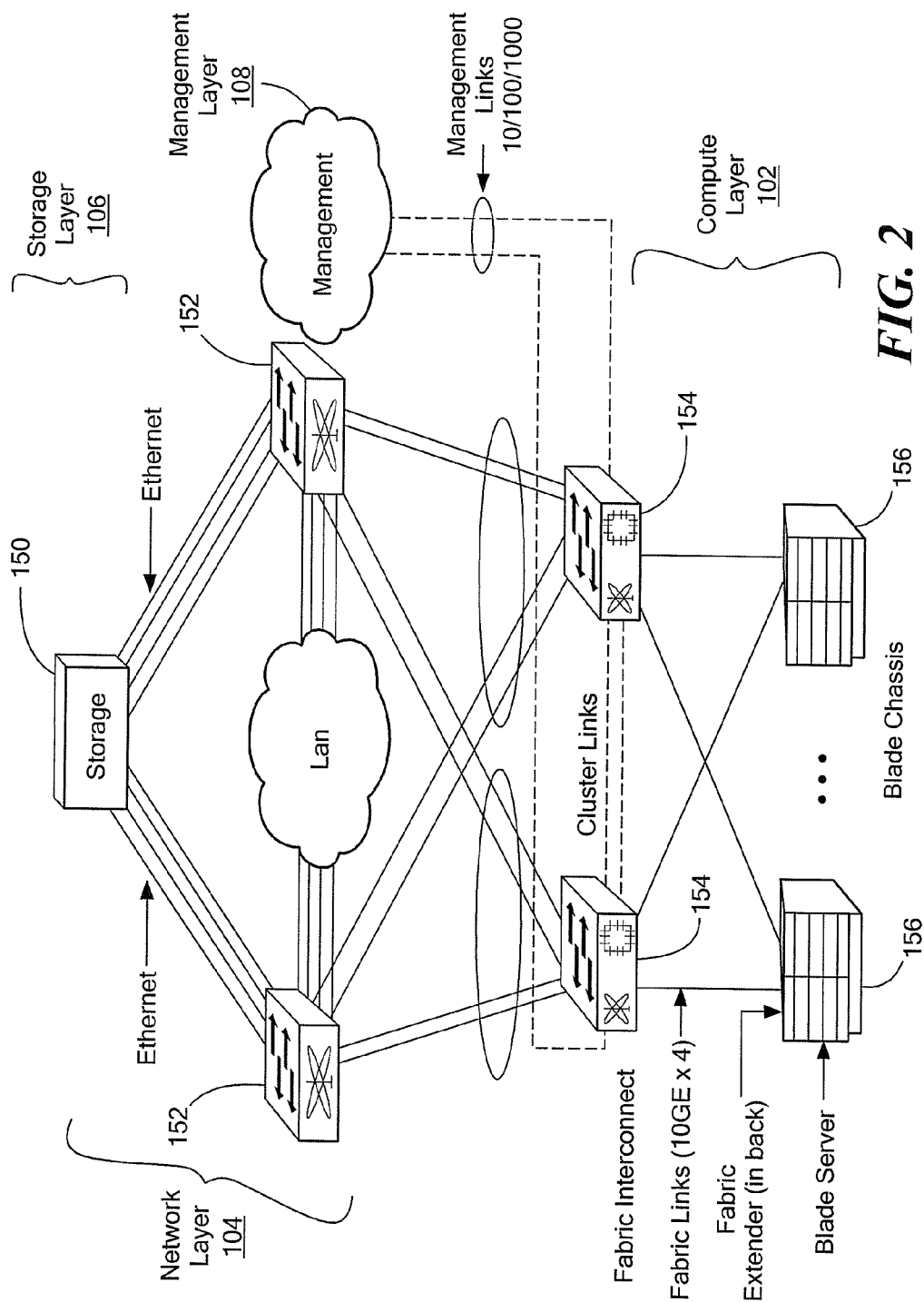
FIG. 2 is a schematic representation showing further detail of the cloud computing system of FIG. 1 including interconnections.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as MDS 9000 Series Multilayer SAN Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
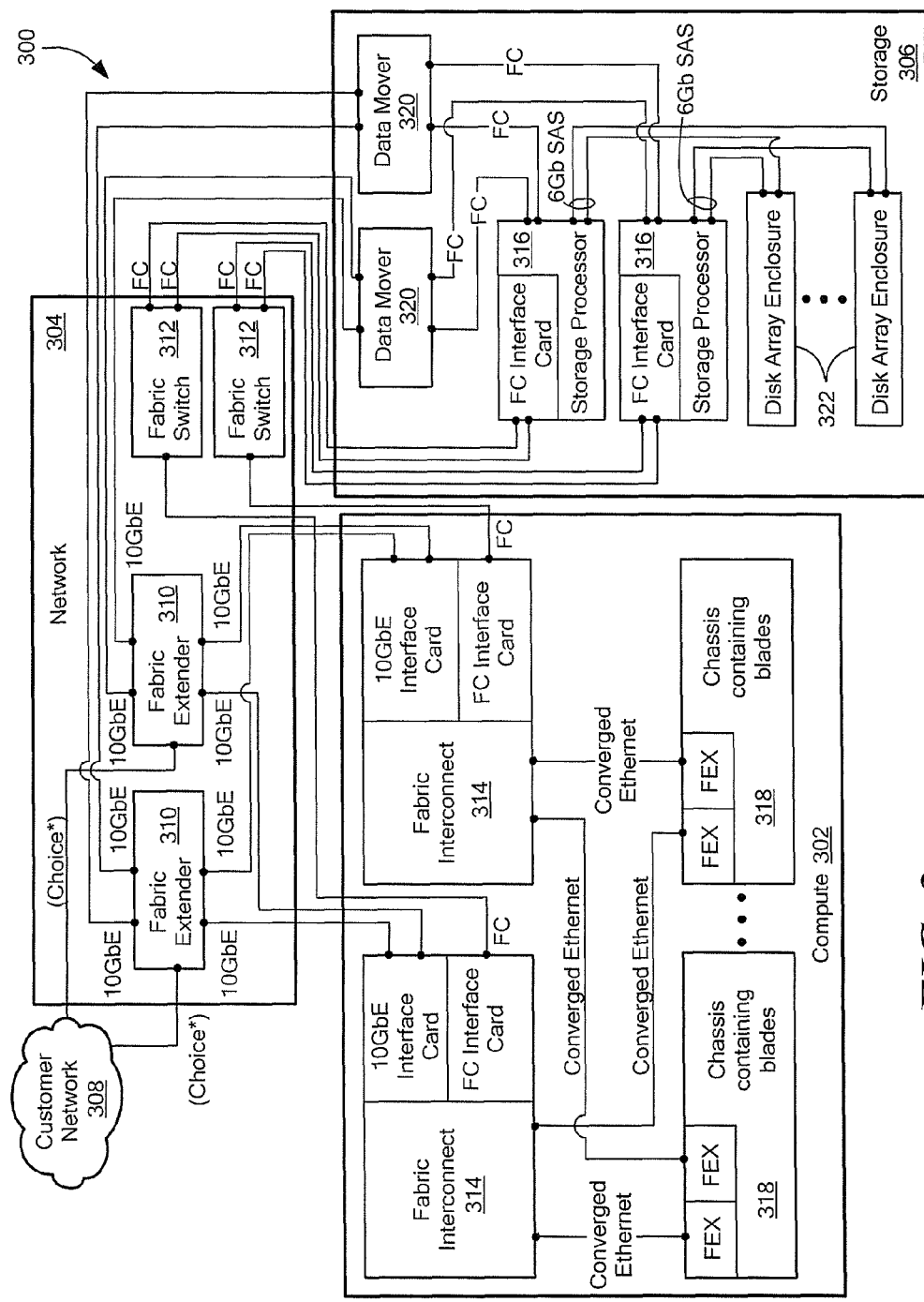
FIG. 3 is a schematic representation showing further detail of the cloud computing system of FIG. 2 including system components.
Figure 4:
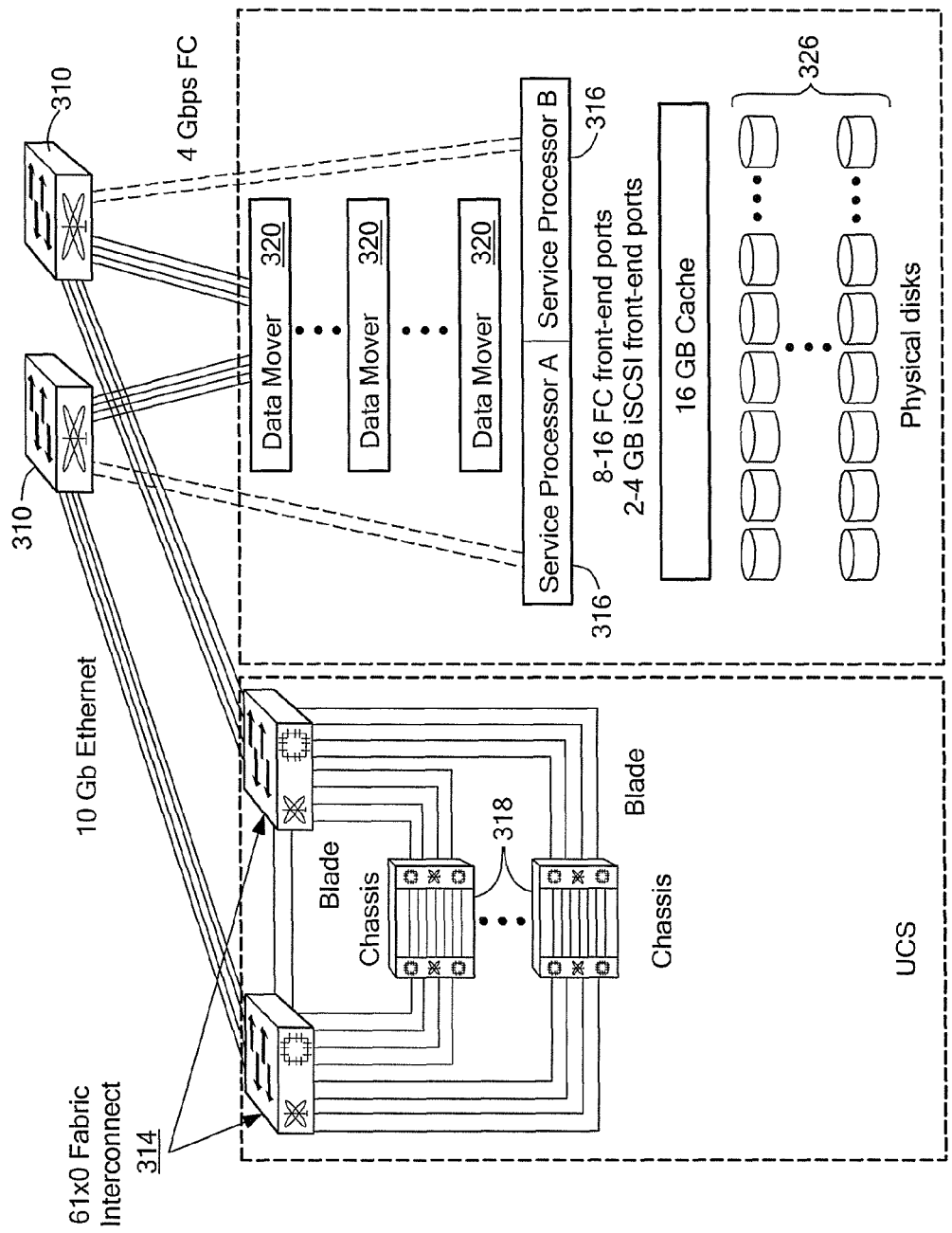
FIG. 4 is a schematic representation showing further detail of a storage layer of the cloud computing system of FIG. 3 using NAS for the storage layer.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports.

It is understood that a variety of other configurations having different interconnections and storage configuration can be provided to meet the needs of a particular application.

The management layer can include a number of applications to perform various functions for overall control, configuration, etc of the various platform components. For example, management applications can include a virtualization function, such as VSPHERE/VCENTER, by VMware of Palto Alto, Calif. A further management application can be provided as the Unified Computing System (UCS) by Cisco. It is understood that the blade chassis and fabric interconnection can be considered part of the UCS. Another management application can includes a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
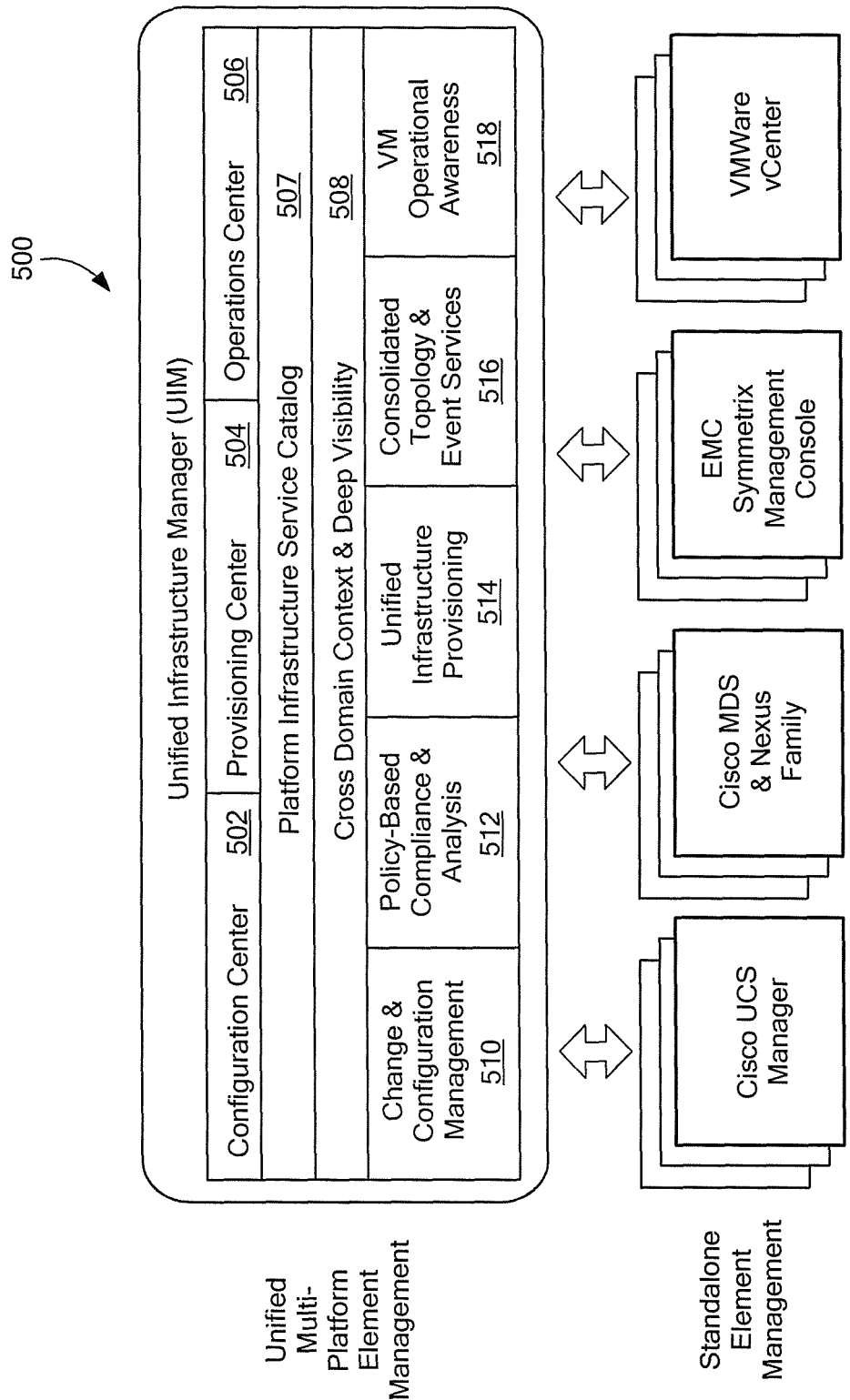
FIG. 5 is a schematic representation of a unified infrastructure manager (UIM) module showing component layering or stack.

FIG. 5 shows an exemplary unified infrastructure manager 500 having performance data collection and transformation in accordance with exemplary embodiments of the invention. In one embodiment, the unified infrastructure manager 500 includes a configuration center module 502, a provisioning center module 504, and an operations center module 506. Below these modules are a platform infrastructure service catalog 507 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications.

The unified infrastructure manager 500 performs platform deployment by abstracting the overall provisioning aspect of the platform(s) and offering granular access to platform components for trouble shooting and fault management.

In one aspect of the invention, a uniform infrastructure management module includes a performance data collection and transformation module to collect and transform performance metrics from physical infrastructure, logical services, virtual applications, and tenant/organizations.

In general, a unified infrastructure management module includes functionality to retrieve performance data from platform components, and transform the performance data to create derived, aggregated metrics.

Exemplary embodiments of the invention enable a unified infrastructure module to collect performance data automatically from various platform components with the high level physical or logical IT resources, such as storage array, storage volume, blade, chassis, fabric interconnect, server, virtual machine, fibre channel switch, IP switch, and the like.

In addition, exemplary embodiments of the invention are useful to automatically transform, when needed, the raw platform performance data to new performance metrics based on the configuration defined in the data model. The model can be fed to the transformation module at compile time or run time on the fly. The relationships among managed entities are created based on the topology service, and are further used to generate aggregated metrics, for logical abstraction, such as service.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed to mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

Data Collection Adapter: A module to interact with platform components to collect performance metrics.

vApp: Virtual Application vCD: VMware vCloud Director

Figure 6:
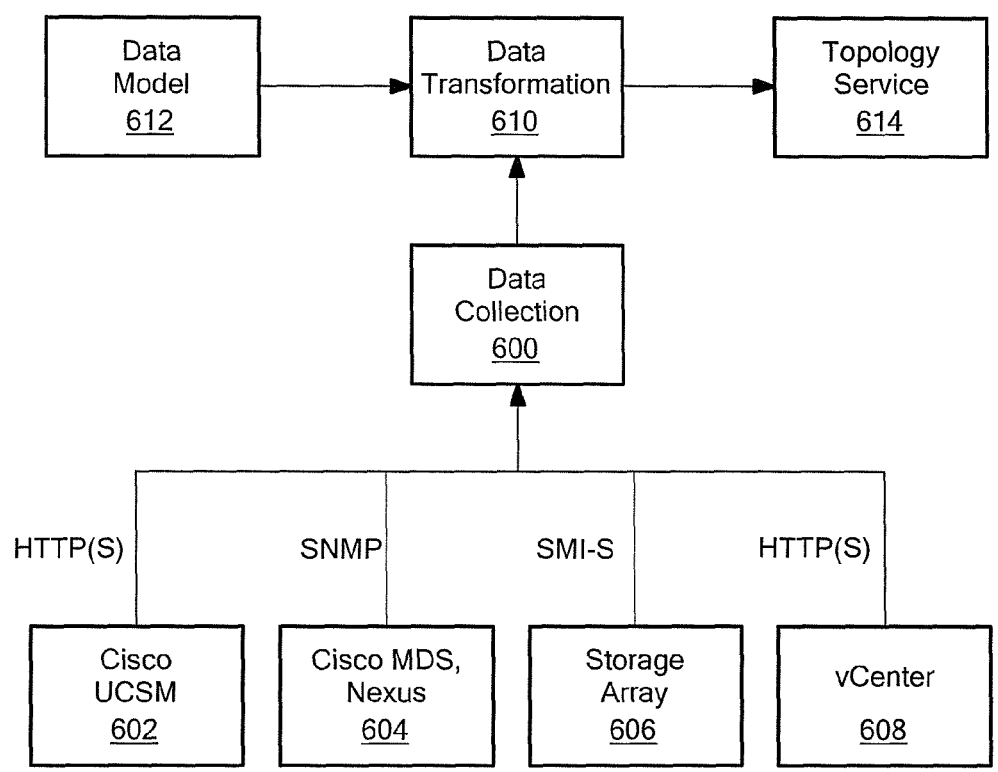
FIG. 6 is a flow diagram showing an exemplary flow of performance data collection and transformation.

FIG. 6 shows an exemplary flow for transformation of performance data in a cloud computing environment. In general, the performance data is collected from platform components by data collection adapters via a variety of protocols, processed and transformed to a user-friendly model representation.

As used herein, the term transformed means that a new performance metric is created based on present or past values of one or more metrics obtained directly from single or multiple components, the physical infrastructure, the virtualization, and/or the businesses and organizations.

Performance data collection 600 collects performance metrics from various platform components, such as fabric interconnects 602, IP/fabric switches 604, storage arrays 606, and platform applications 608. Data transformation 610 is performed on the raw data from 600, using the input from data model 612, and topology information from topology service 614. In an exemplary embodiment, information from topology service 614 is provided to modules including data transformation 610. The topology service has topology data for physical layer (compute, network, and storage) and logical layer.

Figure 7:
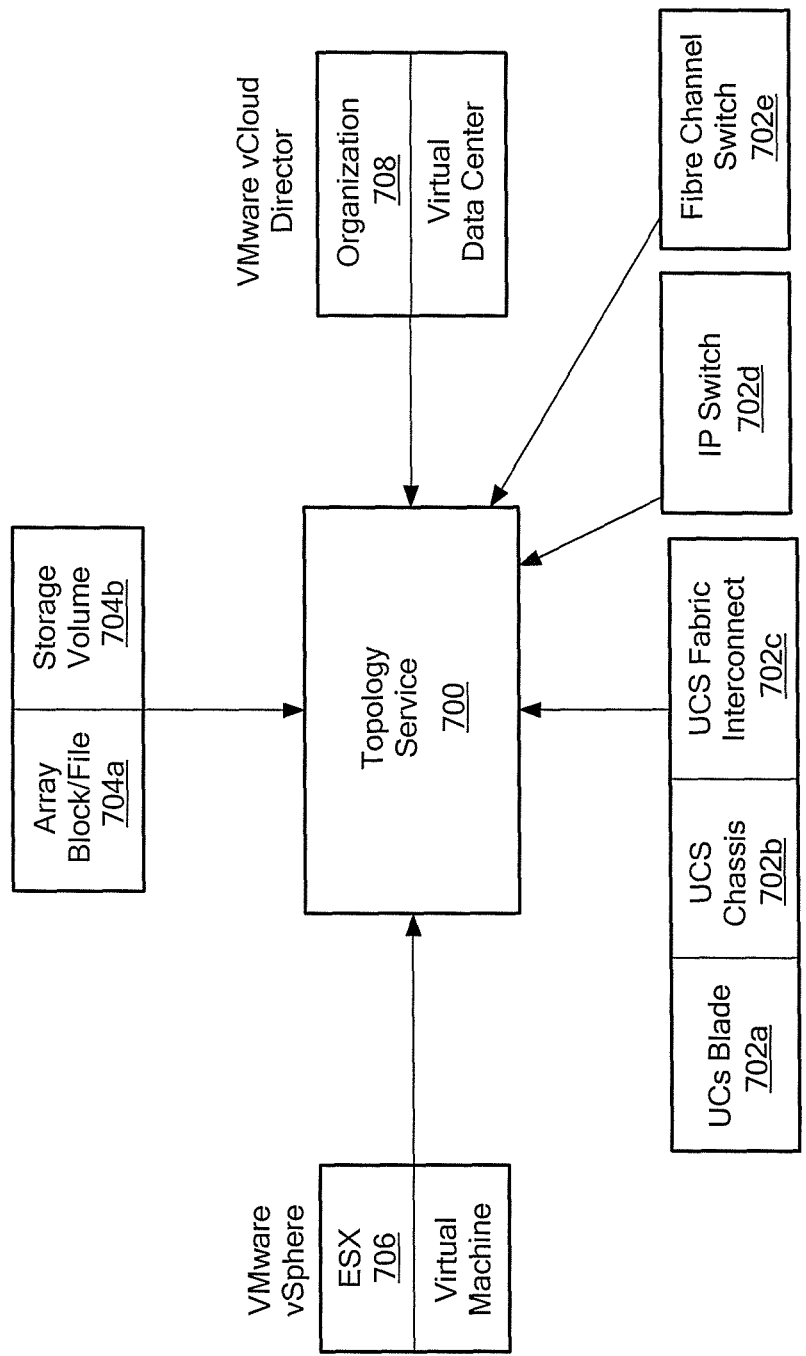
FIG. 7 is a schematic representation of topology service.

FIG. 7 shows an exemplary embodiment of topology service 700. In general, the topology service retrieves from various model supplier adapters (MSAs) the topology feed that contains the unique identifiers of objects (resources) and their relationships with other resources. The retrieval of topology feed can be done by periodical polling.

As shown in FIG. 7, the topology service 700 receives topology data from platform components, such as blades 702a, chassis 702b, fabric interconnects 702c, IP switches 702d, and fibre channel switches 702e. The topology service receives topology data from storage layer components, such as an array 704a, and (logical) storage volume 704b. The topology service also receives topology data from the ESX/virtual machine 706. As is known in the art, ESX is an enterprise-level computer virtualization product offered by VMware, Inc. ESX is a component of VMware Infrastructure, which adds management and reliability services to the core server product. Further topology data can be generated by an organization/virtual data center 708, which can be provided as part of VMware vCloud Director. The data transformation module 610 (FIG. 6) can retrieve resource relationships from the topology service 700, and use the information to create derived metrics or aggregated metrics.

Figure 8:
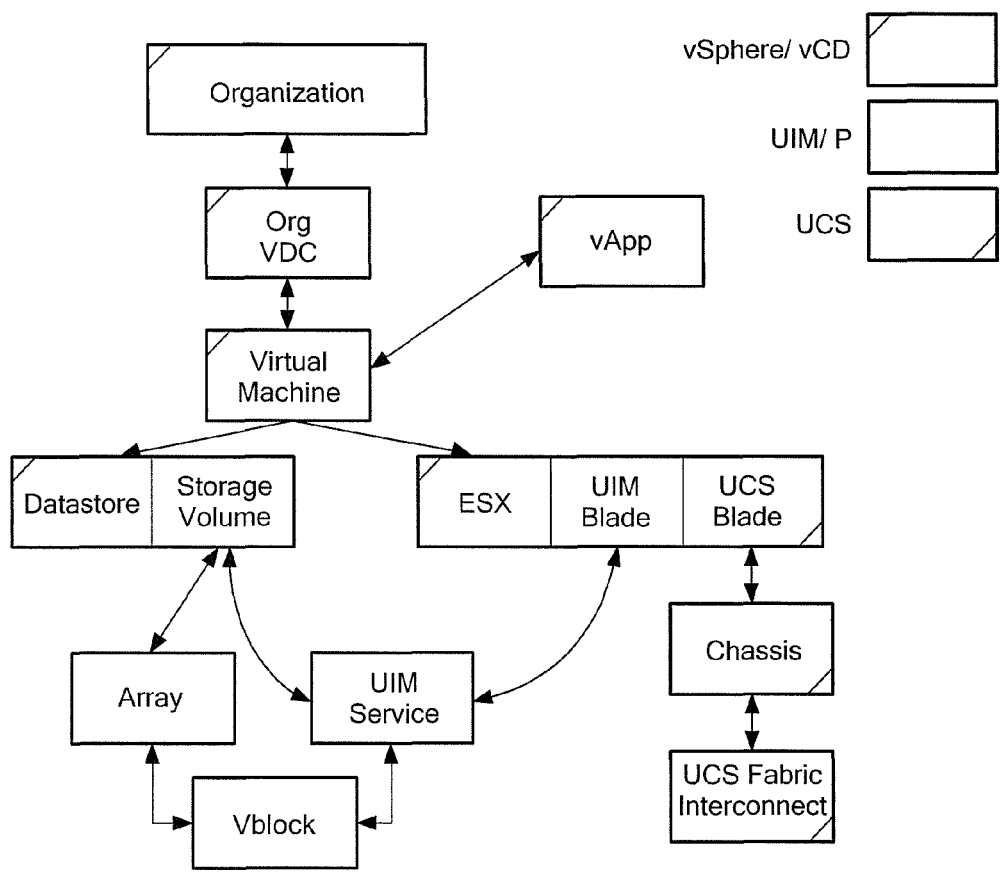
FIG. 8 is a schematic representation of resource relationships.

As discussed above, a platform such as VBLOCK, can comprise components for storage, network, computing and virtualization bound together by technologies from various vendors. As illustrated from the high level resource diagram of FIG. 8, multiple domains and vendor technologies are combined via topology service as illustrated by the two examples below: ESX, UIM Blade, UCS Blade; and Storage Volume and Datastore. The logical services, defined in UIM/Provisioning as UIM Service and sometimes equivalent to the cluster in VMware vSphere, are the building blocks of Infrastructure as a service (IaaS). The performance metrics for a service can be created based on the relationships in FIG. 8.

Figures 9, 9A:
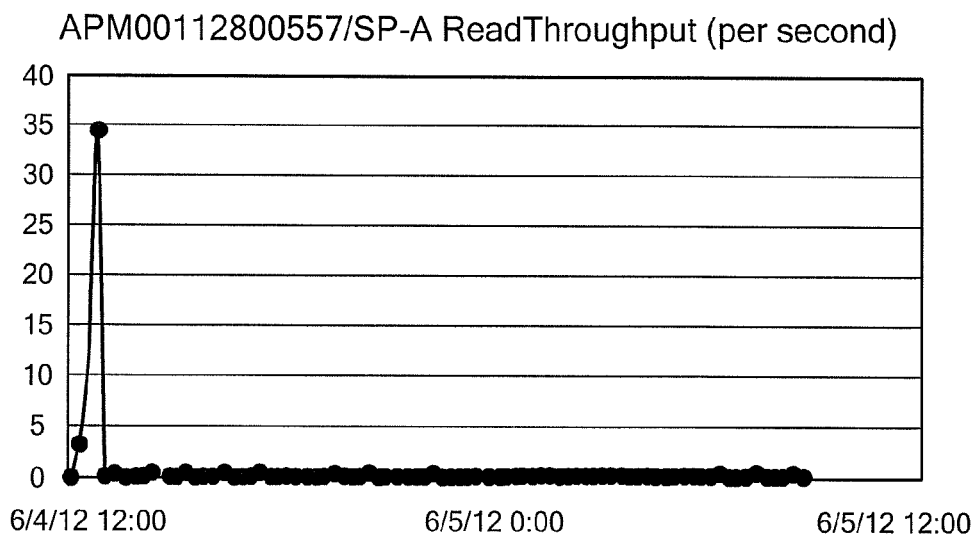
FIG. 9 is a schematic representation of data model for transforming a counter metric to rate.
FIG. 9A is a graphical representation of example data collected and transformed from storage processor of a CLARIION array.

FIG. 9 shows an exemplary embodiment of a data model for transforming a counter metric, cumulative count of all reads (ReadIOs) of storage processor to a rate metric, ReadThroughput, number of reads per second. The transformation module 610 (FIG. 6) can then calculate the new metric based on the formula defined, based on current and previous values of the metric. The past value is cached automatically when rate operator is used in the transformation formula. The raw metric ReadIOs is a counter, which is always increasing. For performance monitoring purposes, how much it is incrementing during the last sampling, or more accurately with time normalization, how much reads in a unit of time (better known as throughput) is a better measurement for the usage of storage processor. FIG. 9A shows the example data collected and transformed from storage processor SP-A of Clariion array APM00112800557.

Figures 10, 10A:
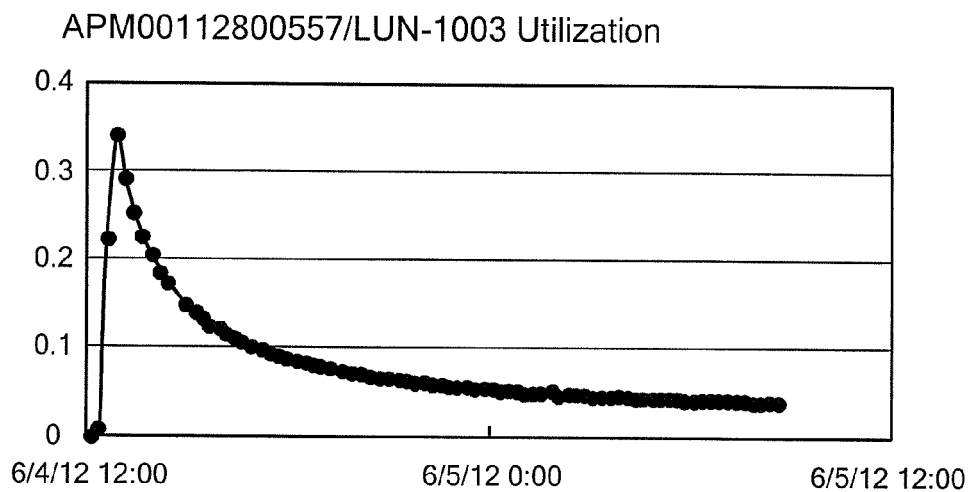
FIG. 10 is a schematic representation of data model for creating new metrics based on two counter metrics.
FIG. 10A is a graphical representation of example data collected and transformed from a storage volume of a CLARIION array

FIG. 10 shows an exemplary embodiment of data model for transforming two metrics, IOTimeCounter (cumulative elapsed I/O time) and IdleTimeCounter (cumulative number of time units for idle time) of storage volume to a new metric, Utilization, which is defined as 100*IOTimeCounter/(IOTimeCounter+IdleTimeCounter). The derived metric characterizes how busy a storage volume is. The transformation module can provide the new metric to its consumers, instead of individual metrics, which will reduce the amount of data that needs to be transmitted, and/or stored. The new metric is more intuitive, and provides insight into the performance of storage volume. FIG. 10A shows example data collected and transformed from storage volume LUN-1003 of Clariion array APM00112800557.

Figures 11, 11A:
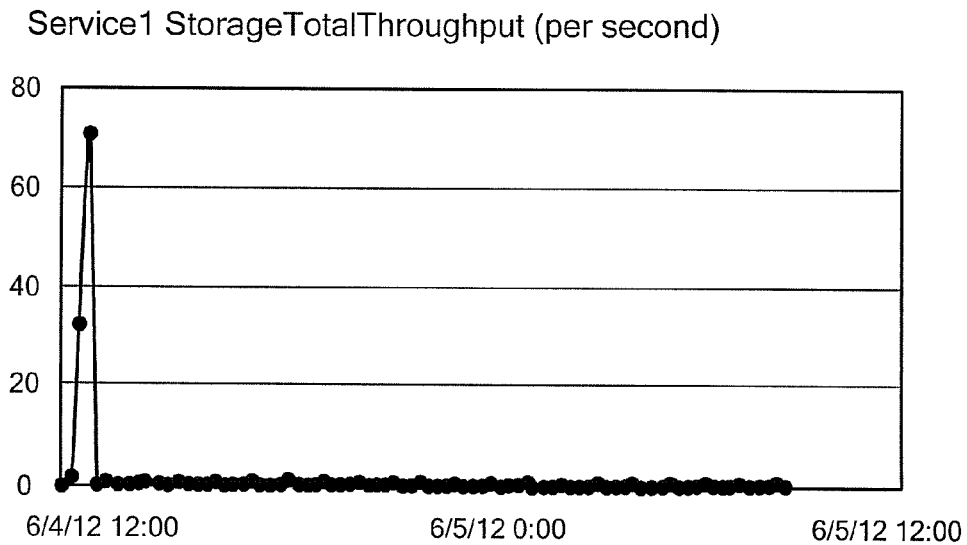
FIG. 11 is schematic representation of data model for creating metric StorageTotalThroughput for service based on the relationship with storage volume.
FIG. 11A is a graphical representation of a storage total throughput metric for a service provisioned with two storage volumes on a CLARIION array.

FIG. 11 shows an exemplary embodiment of data model for creating StorageTotalThroughput metric for service defined as the sum of TotalThroughput of individual storage volume allocated to the service. As mentioned above, a service can have many logical volumes provisioned to it. Based on the relationship, the new metric is computed by adding the TotalThroughput from each storage volume together to get the total storage throughput collectively consumed by the service. If a specific user wants to change the metric definition to a different formula, e.g., instead of sum of total throughput, an average value is preferred in a certain case, the transformation can be tuned at run time. FIG. 11A shows the StorageTotalThroughput metric for an example service, service1, where service1 has been provisioned with two storage volumes on the Clariion array APM00112800557, LUN-1003 and LUN-1004.

Figures 12, 12A:
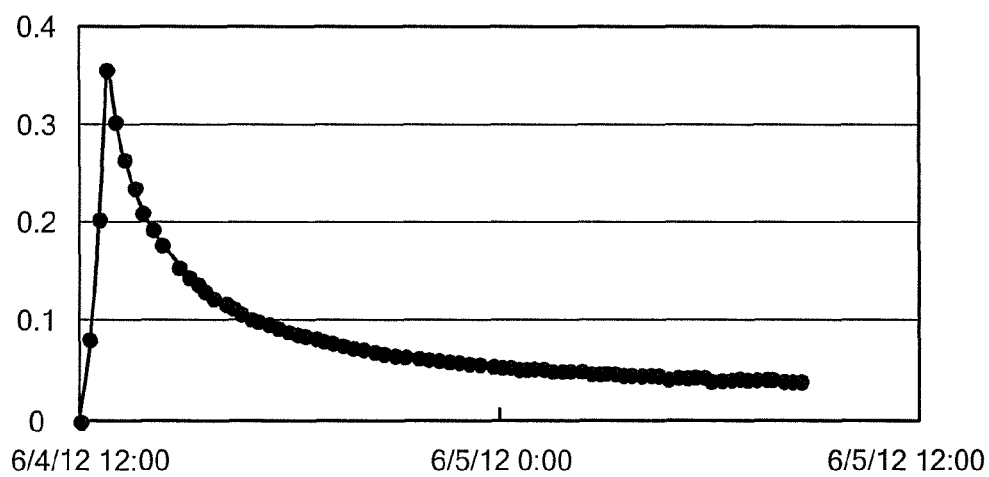
FIG. 12 is schematic representation of data model for creating metric StorageUtilization for a service based on the relationship with storage volume.
FIG. 12A is a graphical representation of example data for a storage utilization metric for the service of FIG. 11A.

FIG. 12 shows an exemplary embodiment of data model for creating StorageUtilization metric for service. The metric value is an arithmetic average of utilization of storage volumes. FIG. 12A shows example data for the StorageUtilization metric for the service1.

FIG. 13 shows an exemplary embodiment of data model for defining relationships of storage system. A storage system comprises storage processors and storage volumes. The relationships between resources of a storage system and a storage processor, and between a storage system and a storage volume can be discovered either from the topology service or from performance data collection adapters.

FIG. 14 shows an exemplary embodiment of a data model for defining relationships of service. A service comprises blades as compute resource, and storage volumes as storage resource among others. The relationships can be queried from the topology service, which query service definitions from the UIM/P model supplier adapter (MSA), along with the resources that are provisioned to the service.

Figure 15:
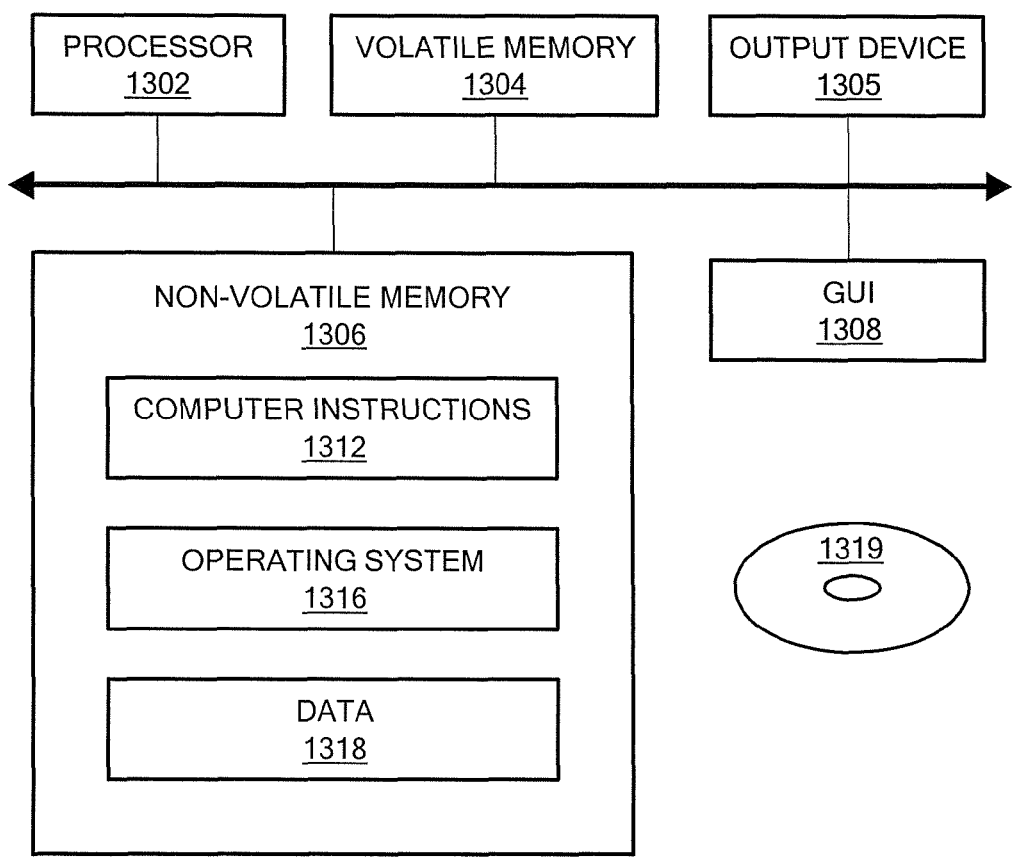
FIG. 15 is a schematic representation of an exemplary computer that can perform at least some of the processing described herein.

FIG. 15 shows an exemplary computer that can perform at least a part of the processing described herein. A computer includes a processor 1302, a volatile memory 1304, an output device 1305, a non-volatile memory 1306 (e.g., hard disk), and a graphical user interface (GUI) 1308 (e.g., a mouse, a keyboard, a display, for example). The non-volatile memory 1306 stores computer instructions 1312, an operating system 1316 and data 1318, for example. In one example, the computer instructions 1312 are executed by the processor 1302 out of volatile memory 1304 to perform all or part of the processing described above. An article 1319 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   collecting performance data for a service comprising components of a cloud computing system, wherein the cloud components include at least one of a fabric interconnect in a compute layer, a switch in a network layer, and a storage array in a storage layer, the cloud computing system having a management layer;
   processing, using a computer processor, raw data from objects including at least one fabric interconnect, switch and storage array, storage volume, blade, server, chassis, and virtual machine;
   obtaining topology information for the service for the at least one fabric interconnect, switch, and storage array and the storage volume, blade, server, chassis, virtual data center and virtual machine from a topology service that uses model supplier adapters containing unique identifiers of the objects of the service and the relationship with other ones of the objects, wherein the service comprises blades in the computer layer and storage volumes in the storage layer;
   querying the relationships using the topology service containing the topology information, wherein the topology service uses definitions from the model supplier adapters; and
   transforming, using the topology information, the raw data into performance metrics, wherein the model supplier adapters include a data model for creating a storage utilization metric for the service from storage volumes in the service, a data model for defining relationships of the objects in the service including storage processors and the storage volumes, and a data model for defining relationships of the service comprising blades, wherein the topology service maintains the performance metrics at a physical layer and a logical layer, and
   wherein the service comprises a number of storage volumes, and further including transforming, using the topology information, raw data of throughput of the number of storage volumes into a performance metric corresponding to total storage throughput consumed by the service.

2. The method according to claim 1, wherein further including transforming first and second metrics to a new metric, the first metric comprising IOTimeCounter (cumulative elapsed I/O time) and the second metric comprising IdleTimeCounter (cumulative number of time units for idle time) of storage volume to the new metric comprising utilization defined as 100*IOTimeCounter/(IOTimeCounter+IdleTimeCounter) for providing a measure of business for the storage volume is.

3. The method according to claim 2, wherein the objects can be related and defined in the configuration.

4. The method according to claim 2, further including transforming performance data from the network layer.

5. The method according to claim 2, further including transforming performance data from the storage layer.

6. The method according to claim 2, further including transforming performance data from the compute layer.

7. The method according to claim 2, further including transforming performance data from the management layer.

8. The method according to claim 2, further including creating performance metrics for logical layers based on relationships to physical layers.

9. The method according to claim 1, wherein a storage total throughput metric for a service comprises a sum of a total throughput of storage volumes allocated to a service having at least a service fabric interconnect, a service switch, and the storage volumes, to determine a total storage throughput for the service.

10. The method according to claim 1, wherein the performance metric includes a storage utilization metric for a service, wherein the storage utilization metric comprises an arithmetic average of utilization of storage volumes.

11. The method according to claim 1, further including using a data model for defining relationships between resources of the storage system and a storage processor, and between the storage system and a storage volume.

12. The method according to claim 1, further including receiving a user change to the performance metric tuned at run time.

13. The method according to claim 1, wherein the management layer comprises a configuration center module, a provisioning center module, an operations center module, a platform infrastructure service catalog, and a cross domain context and visibility module.

14. An article, comprising:
A non-transitory computer readable medium storing instructions that enable a machine to perform:
collecting performance data from components of a cloud computing system, wherein the cloud components include at least one of a fabric interconnect in a compute layer, a switch in a network layer, and a storage array in a storage layer, the cloud computing system having a management layer;
processing, using a computer processor, raw data from objects including at least one fabric interconnect, switch and storage array;
obtaining topology information for the service for the at least one fabric interconnect, switch, and storage array from a topology service that uses model supplier adapters containing unique identifiers of the objects of the service and the relationship with other ones of the objects, wherein the service comprises blades in the computer layer and storage volumes in the storage layer;
querying the relationships using the topology service containing the topology information, wherein the topology service uses definitions from the model supplier adapters; and
transforming, using the topology information, the raw data into performance metrics, wherein the model supplier adapters include a data model for creating a storage utilization metric for the service from storage volumes in the service, a data model for defining relationships of the objects in the service including storage processors and the storage volumes, and a data model for defining relationships of the service comprising blades, wherein the topology service maintains the performance metrics at a physical layer and a logical layer, and
wherein the service comprises a number of storage volumes, and further including transforming, using the topology information, raw data of throughput of the number of storage volumes into a performance metric corresponding to total storage throughput consumed by the service.

15. The article according to claim 14, further including instructions for transforming performance data from the network layer, the storage layer, and the compute layer.

16. The article according to claim 14, wherein the performance metric includes a storage total throughput metric for a service defined as a sum of total throughput of individual storage volumes allocated to the service.

17. The article according to claim 14, wherein the performance metric includes a storage utilization metric for a service, wherein the storage utilization metric comprises an arithmetic average of utilization of storage volumes.

18. A system, comprising:
a cloud computing system comprising:
a computer layer;
a storage layer;
a network layer coupled between the compute and storage layer; and
a management layer to control the system, the management layer comprising stored instructions to enable the management layer to:
collect performance data from components of a cloud computing system, wherein the cloud components include at least one of a fabric interconnect in a compute layer, a switch in a network layer, and a storage array in a storage layer, the cloud computing system having a management layer;
process, using a computer processor, raw data from objects including at least one fabric interconnect, switch and storage array;
obtain topology information for a service for at least one fabric interconnect, switch, and storage array from a topology service that uses model supplier adapters containing unique identifiers of objects of the service and the relationship with other ones of the objects, wherein the service comprises blades in the computer layer and storage volumes in the storage layer;
query the relationships using the topology service containing the topology information, wherein the topology service uses definitions from the model supplier adapters; and
transform, using the topology information, the raw data into performance metrics, wherein the model supplier adapters include a data model for creating a storage utilization metric for the service from storage volumes in the service, a data model for defining relationships of the objects in the service including storage processors and the storage volumes, and a data model for defining relationships of the service comprising blades, wherein the topology service maintains the performance metrics at a physical layer and a logical layer, and
wherein the service comprises a number of storage volumes, and further including transforming, using the topology information, raw data of throughput of the number of storage volumes into a performance metric corresponding to total storage throughput consumed by the service.

* * * * *